Oct. 29, 1940.  N. L. JACOBUS  2,219,870
MEANS FOR PROMOTING PLANT GROWTH
Filed Jan. 28, 1938  2 Sheets-Sheet 1
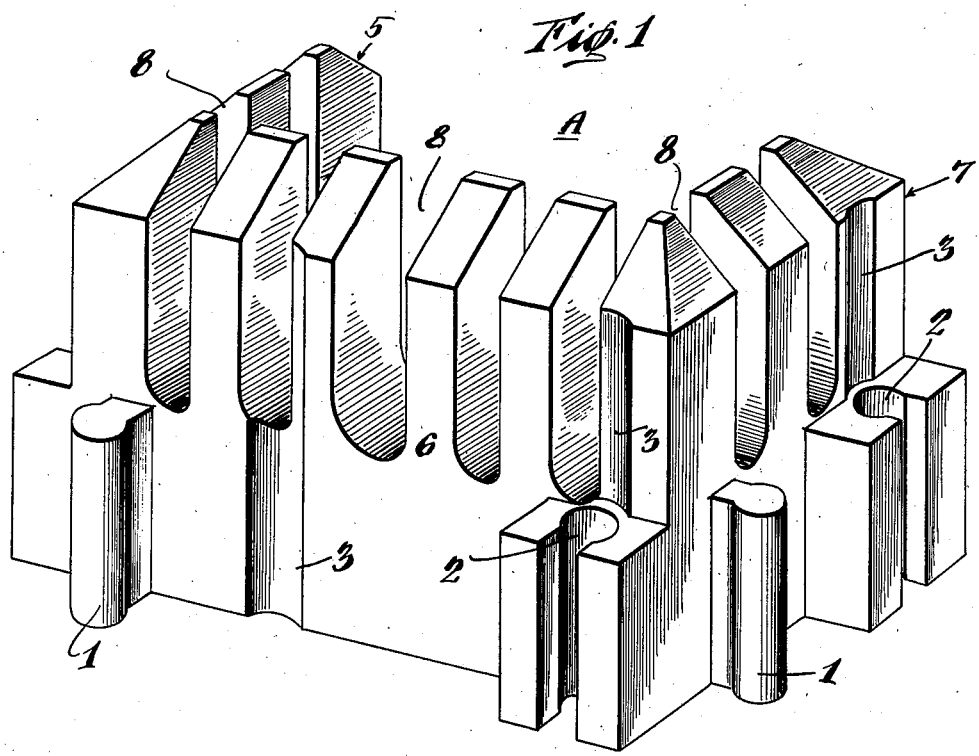
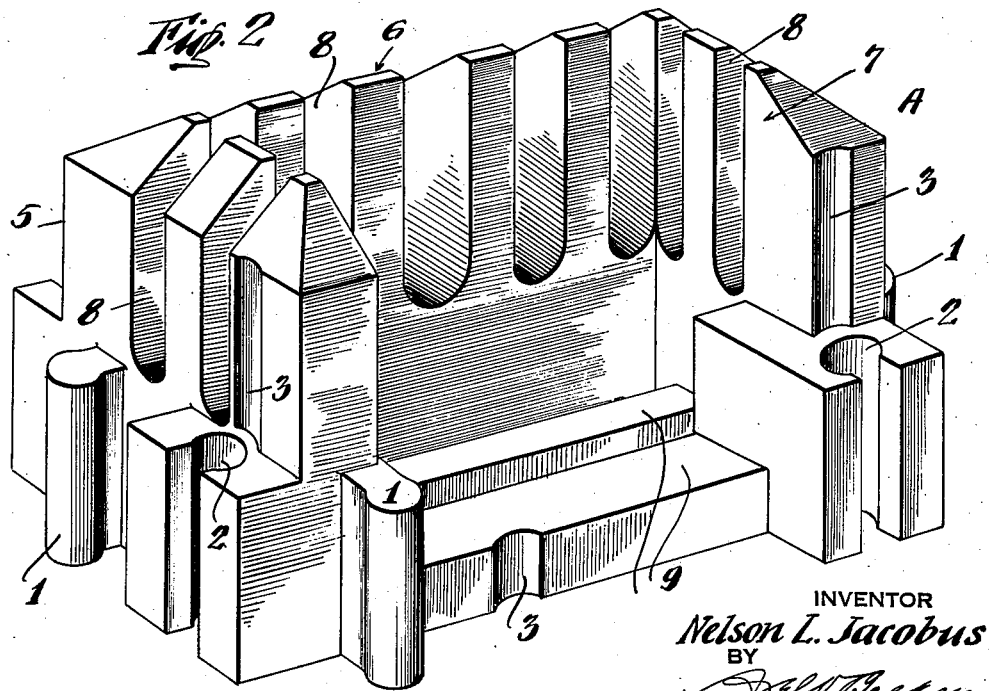
INVENTOR
Nelson L. Jacobus
BY
ATTORNEY

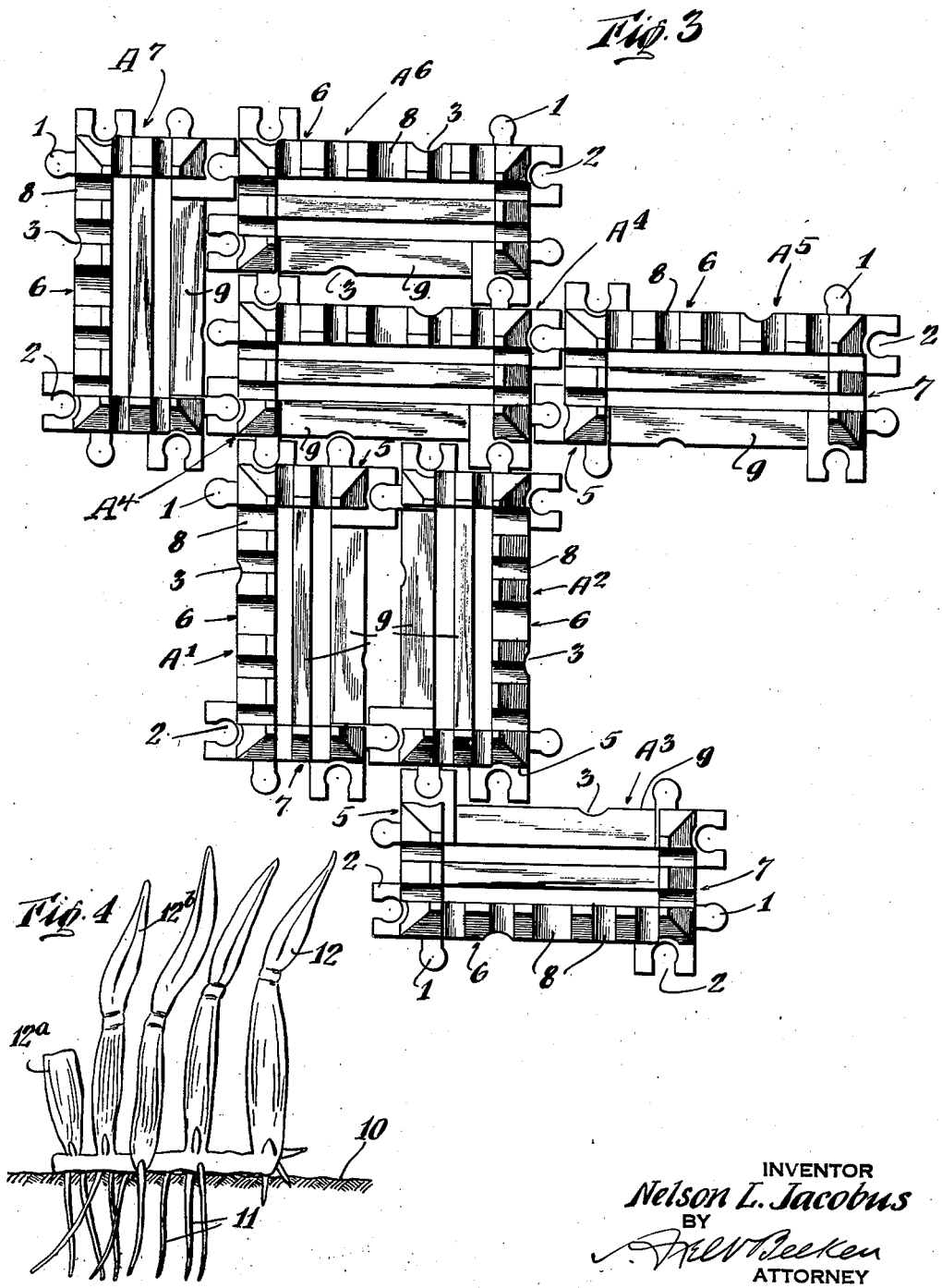

Patented Oct. 29, 1940

2,219,870

UNITED STATES PATENT OFFICE 2,219,870

MEANS FOR PROMOTING PLANT GROWTH

Nelson L. Jacobus, Hempstead, N. Y.

Application January 28, 1938, Serial No. 187,348

4 Claims. (Cl. 47—34)

The present invention relates generally to the art of promoting plant growth, and has more particularly reference to the art of promoting the growth of creeping plants such as certain species of orchids. The main, though not the exclusive, object of the invention is to allow the plant to determine its own direction of growth without the necessity of transplanting it, and the invention consists in the hereinafter described method and means for carrying out this object.

In the accompanying drawings the invention is disclosed in a concrete form in which:

Fig. 1 is a perspective view of the outside of a container-unit;

Fig. 2 is a perspective view of the inside of a container-unit;

Fig. 3 is a plan view of a number of container-units connected together; and

Fig. 4 is a diagrammatic view showing the growth of an orchid of the creeping type.

In Figs. 1 and 2 are shown an outside and an inside view of a container-unit A, said unit being one of a number of similar units used in carrying out the method of my invention. The units are preferably of like size and shape, and means are provided to detachably connect said units in a plurality of variably arranged groupings. The preferred shape is a rectangular one, and the preferred means for detachably connecting said units consist of projections that protrude from the sides of the units, said projections having vertically extending complementary tongues 1 and grooves 2, each side of the unit having at least one tongue and one groove. On the sides of the rectangle are also auxiliary grooves 3 which are not carried by a projection and are simply for the purpose of affording clearance to facilitate the assembling of the units. As shown, the rectangle formed by each unit is preferably of such dimension that the short sides are slightly less than one-half the length of the long sides, and it will be observed that tongue 1 and groove 2 on a long side of the rectangle are spaced much further apart than the corresponding tongue and groove on a short side of the rectangle. The result, as shown in Fig. 3, is that the connecting means of each side of a unit can be detachably connected with the connecting means of any side of a similar unit.

The container-unit can be of any material suitable for the purpose but, preferably, it is molded pottery ware. It can be provided with vertical sidewalls on all four sides but, preferably, it is only provided with sidewalls 5, 6 and 7 on three sides, the fourth side being devoid of a wall. In the present instance, the walls are provided with vertical slots 8 for quick drainage, and for the same reason the bottom is open being composed of horizontal slats 9 that are spaced apart. In practice, two of the units as A1 and A2 (Fig. 3) are preferably connected together with their open sides facing each other and with tongue 1 of unit A1 engaging groove 2 of unit A2 and vice versa. In the case of a creeping plant, the receptacle thus formed is filled with compost to the very top of the side walls thus forming a growing-surface 10 (Fig. 4). This growing-surface can now be enlarged to afford a substantially uninterrupted growing-surface in any direction arbitrarily selected by the plant by providing one or more additional container-units as A3 or A4, A5, A6, A7, etc.

Although it is by no means intended to limit the invention for use in connection with the growth of orchids of the creeping plant type, it is pointed out that the invention is peculiarly adapted to meet the vagaries of such orchids. In Fig. 4 is shown a highly idealized view of a plant of this type in connection with a growing-surface indicated by line 10. This plant grows on top of the surface and at intervals sends down roots as 11 and sends up bulbs as 12 and it is a characteristic of this plant that a "break" may occur in any direction. It is a further characteristic of the plant that, after being bedded on a growing surface, the first bulb sent up is rather mediocre, the second more beautiful and the third and subsequent ones really gorgeous. If, therefore, the growing surface is limited in extent and makes it necessary to transplant a portion of the plant the process begins all over again, that is, a mediocre bulb is first sent up and so forth. It is manifestly therefore of great advantage to have a substantially continuous or substantially uninterrupted growing-surface, but as it is not known in which direction the plant will break it has heretofore not been possible to provide such surface without having a surface out of all proportion to the plant. It is a still further characteristic of the plant that the initial bulb eventually becomes dormant and draws nourishment from the younger bulbs. It is therefore advantageous to sever such bulb or bulbs from the plant in order not to rob the remaining bulbs of vitality and strength. In Fig. 4, a dormant bulb is shown at 12a and a semi-dormant bulb at 20b. The remaining bulbs are more or less active and self-sustaining. It will now be seen that the dormant bulbs and the exhausted part of the plant can be severed from the remainder and the container-unit supporting the severed portion of the plant can then be detached from the other units and be used elsewhere. Thus there is provided a substantially uninterrupted growing-surface expansible in any direction that renders transplanting unnecessary.

I claim:

1. A container-unit comprising: a rectangular-shaped member, and projections protruding outwardly from the sides of said member and having vertically extending complementary tongues and grooves, each side having at least two projections one having a tongue and one having a groove.

2. A container-unit comprising: a rectangular-shaped member having side walls on three sides and devoid of a side wall on its fourth side, and two projections protruding outwardly from each of all four sides of said member and the projections of each side having vertically extending complementary tongues and grooves.

3. In a system of plant growth, a plurality of rectangular-shaped container units, and complementary means associated with each side of each unit to detachably connect it with the complementary means of any side of a similar unit or, at will to detachably connect the long side of one unit with the short sides of two similar units.

4. A container unit comprising: a rectangular-shaped member of molded material, integrally molded projections on said member protruding outwardly from the sides thereof, said projections having vertically extending complementary tongues and grooves, each side of the container having at least one tongue and one groove, whereby any side of the unit can be detachably associated with any side of a similar unit.

NELSON L. JACOBUS.